No. 786,751.

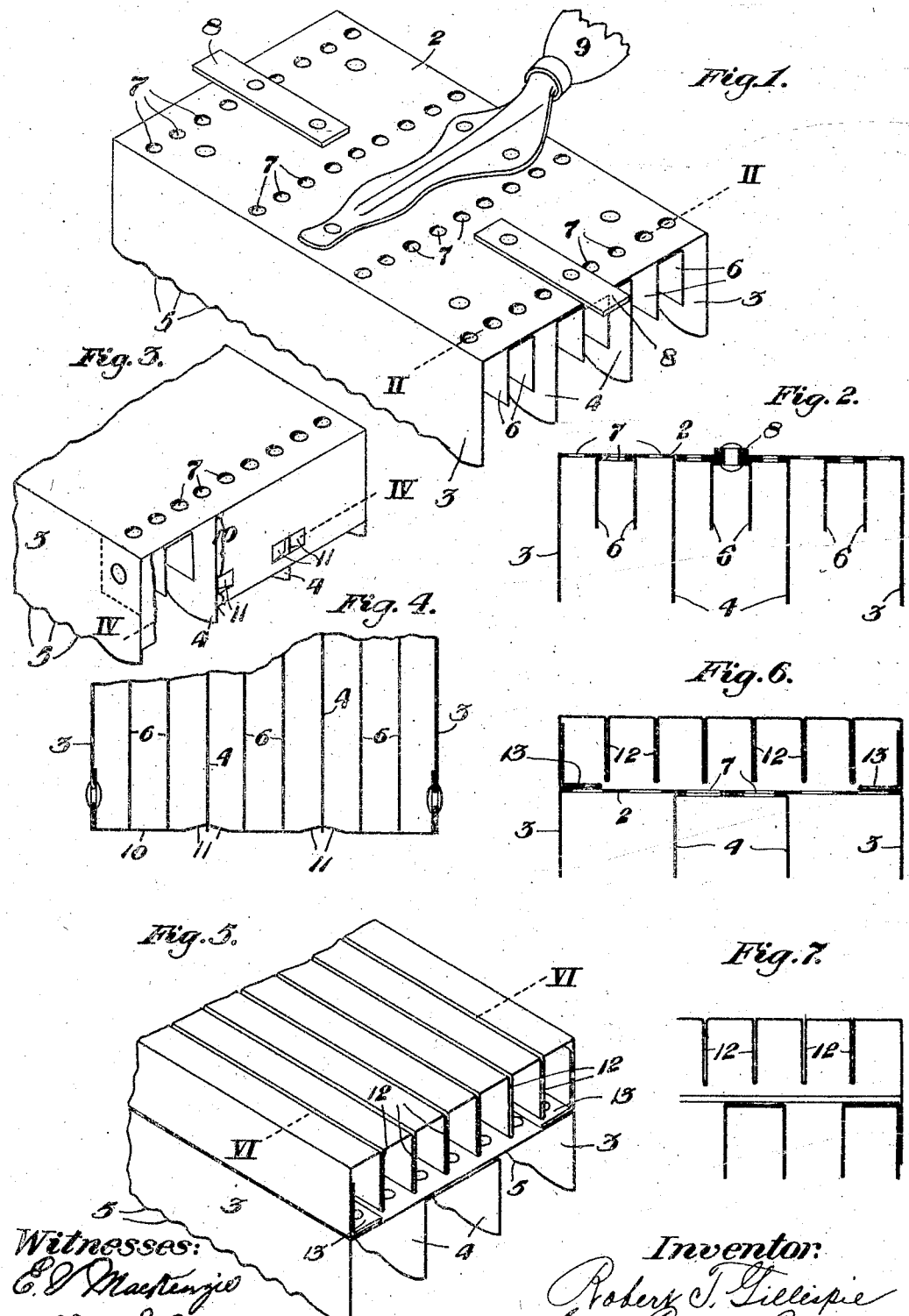

Patented April 4, 1905.

UNITED STATES PATENT OFFICE.

ROBERT T. GILLESPIE, OF ROCHESTER, PENNSYLVANIA.

CURRYCOMB.

SPECIFICATION forming part of Letters Patent No. 786,751, dated April 4, 1905.

Application filed March 31, 1904. Serial No. 200,891.

*To all whom it may concern:*

Be it known that I, ROBERT T. GILLESPIE, a citizen of the United States, residing at Rochester, in the county of Beaver and State of Pennsylvania, have invented certain new and useful Improvements in Currycombs, of which the following is a specification, reference being had therein to the accompanying drawings, forming part of this specification, in which—

Figure 1 is a perspective view of my improved currycomb. Fig. 2 is a vertical cross-section on the line II II of Fig. 1. Fig. 3 is a partial perspective view showing a closed-in end construction. Fig. 4 is a horizontal section on the line IV IV of Fig. 3. Fig. 5 is a partial perspective view showing the dust-partitions above the main body of the comb. Fig. 6 is a cross-section on the line VI VI of Fig. 5. Fig. 7 is a partial similar view showing the same arrangement applied to an ordinary comb.

My invention refers to improvements in currycombs; and it has for its objects to provide means for collecting the dust, dandruff, &c., consisting of vertically-arranged walls or shelves to which the dust will adhere as the comb is used and from which it may be readily dislodged. The invention refers to such devices and to the construction of the comb in other details and also to an improved serrated or scalloped tooth edge of the scraper-blades.

Referring now to the drawings, 2 is the top of the comb, formed of a single piece of thin sheet metal, as iron or aluminium, turned down at each side, providing the outer scraper-blades 3 3, the top and sides being thus formed of one sheet. Intermediate blades 4 are formed in a similar manner of sheet metal and secured to the top by rivets or other suitable means. The lower edges of the blades are provided with serrated or corrugated teeth 5, very blunt and in the form of an undulating, waving, or scalloped line, the object being to avoid sharp cutting-points. I have found in practice that these blunt teeth give excellent results in dislodging the dandruff and entirely prevent cutting or scraping of the skin.

Between the blades of the comb, secured to the top, are a series of downwardly-extending dust-blades 6, also of sheet metal, made in any suitable manner and secured to the top by rivets or otherwise. These blades may conveniently be made in pairs, as shown, of longitudinal pieces, providing double blades or shelves of less depth than the comb-blades and of any number desired. These depending shelves provide partitions dividing the space between the blades and serve to catch the dust and dandruff which settles upon them after being raised by the comb. The top is provided with openings 7, preferably quite numerous, so as to allow free circulation of air, thus causing a draft which carries the dust and brings it into contact with the collecting-partitions or carries it off to the outside of the comb. Knockers 8 are provided at each end, if desired, and the usual handle 9 is attached to the back, the knockers and handle being held by any suitable means, as rivets. As shown in Fig. 1, the same rivets are employed to secure the collecting-partitions to the top and also to hold the knockers and handle, thus requiring but comparatively few rivets for the entire comb.

The end of the comb may be entirely or partially closed by a downward extension 10 of the top 2, as in Fig. 3, the turned-down end being formed of a continuation of the top, bent over and provided with inwardly-turned lips, which are secured to the sides by rivets, as shown, or otherwise. The end 10 is also cut through at suitable positions, providing the wings 11, which are bent inwardly and engage the intermediate blades 4 near the bottom, as shown in Fig. 4, thus firmly connecting the front therewith and rigidly supporting the blades. When the ends of the comb are closed, the ventilation-holes may also be used, if desired, or reduced in number or entirely dispensed with.

Various other applications of the depending dust-collecting partitions may be made, and in Figs. 5 and 6 I have shown a series of partitions 12, formed of a continuous crimped sheet of metal, secured to the top 2 by flanges 13. Fig. 7 shows the application of a similar crimped-sheet series of partitions to an ordinary comb, and it will be obvious that it is not essential that the partitions shall be beneath the top, as the circulation of air caused by the numerous draft-openings will carry the dandruff in various directions, and it will settle and adhere to the partitions with equal readiness above the top as below. The dust will also accumulate on the parts of the comb proper; but by providing the numerous partitions and their comparatively large area the larger amount will become collected upon them. From time to time the accumulated dust may be dislodged by striking the knocker 8 against a wall or other hard surface.

Changes and modifications may be made by the skilled mechanic in the number or form of the partitions or in the various other details of construction without departing from the invention; but all such are to be considered as within the scope of the following claims.

What I claim is—

1. A currycomb consisting of an integral top provided with lateral scraping-blades, intermediate scraping-blades extending downwardly therefrom, and flat dust-collecting partitions arranged between the scraping-blades, substantially as set forth.

2. A currycomb consisting of a sheet-metal back provided with lateral scraping-blades at right angles thereto, intermediate scraping-blades similarly arranged, and flat dust-collecting partitions extending at right angles from the top arranged between the scraping-blades, substantially as set forth.

3. A currycomb consisting of a sheet-metal back provided with air-circulation openings, lateral scraping-blades at right angles thereto, intermediate scraping-blades similarly arranged, and flat dust-collecting partitions extending at right angles from the top arranged between the scraping-blades, substantially as set forth.

4. A currycomb consisting of a sheet-metal back provided with air-circulation openings, knockers attached to the back, lateral scraping-blades at right angles thereto, intermediate scraping-blades similarly arranged, and flat dust-collecting partitions extending at right angles from the top arranged between the scraping-blades, substantially as set forth.

5. A currycomb consisting of a sheet-metal top having air-circulation openings, and downwardly-extending scraper-blades at each side, intermediate scraper-blades secured to the top, and intervening dust-collecting partitions arranged between the scraper-blades extending at right angles from the top, substantially as set forth.

6. A currycomb consisting of a back of sheet metal provided with integral laterally-disposed scraping-blades at each side, air-circulation openings through the top, intervening scraping-blades extending at right angles from the top, dust-collecting partitions between the scraping-blades and of less depth extending at right angles from the top between the scraping-blades, and knocker projections, and a handle secured to the top, substantially as set forth.

7. A currycomb consisting of a sheet-metal top provided with downwardly-turned sides consisting of scraper-blades, downwardly-turned inclosing ends, intervening scraper-blades, and dust-partitions extending downwardly at right angles from the top between the scraper-blades, substantially as set forth.

8. In a currycomb the combination of a sheet-metal back provided with downwardly-turned scraper-blades at each side, intermediate parallel scraper-blades, intervening downwardly-extending dust-collecting partitions, and downwardly-turned ends having cut-out portions extending inwardly and engaging the intermediate scraper-blades, substantially as set forth.

9. A currycomb consisting of a sheet-metal back provided with air-circulation openings and downwardly-turned scraping-blades provided with blunt, scalloped teeth, with dust-collecting partitions arranged between the scraping-blades, secured to the back and extending downwardly therefrom at right angles, substantially as set forth.

In testimony whereof I affix my signature in presence of two witnesses.

ROBERT T. GILLESPIE.

Witnesses:
 CHAS. W. HURST,
 LAURA HURST.